UNITED STATES PATENT OFFICE.

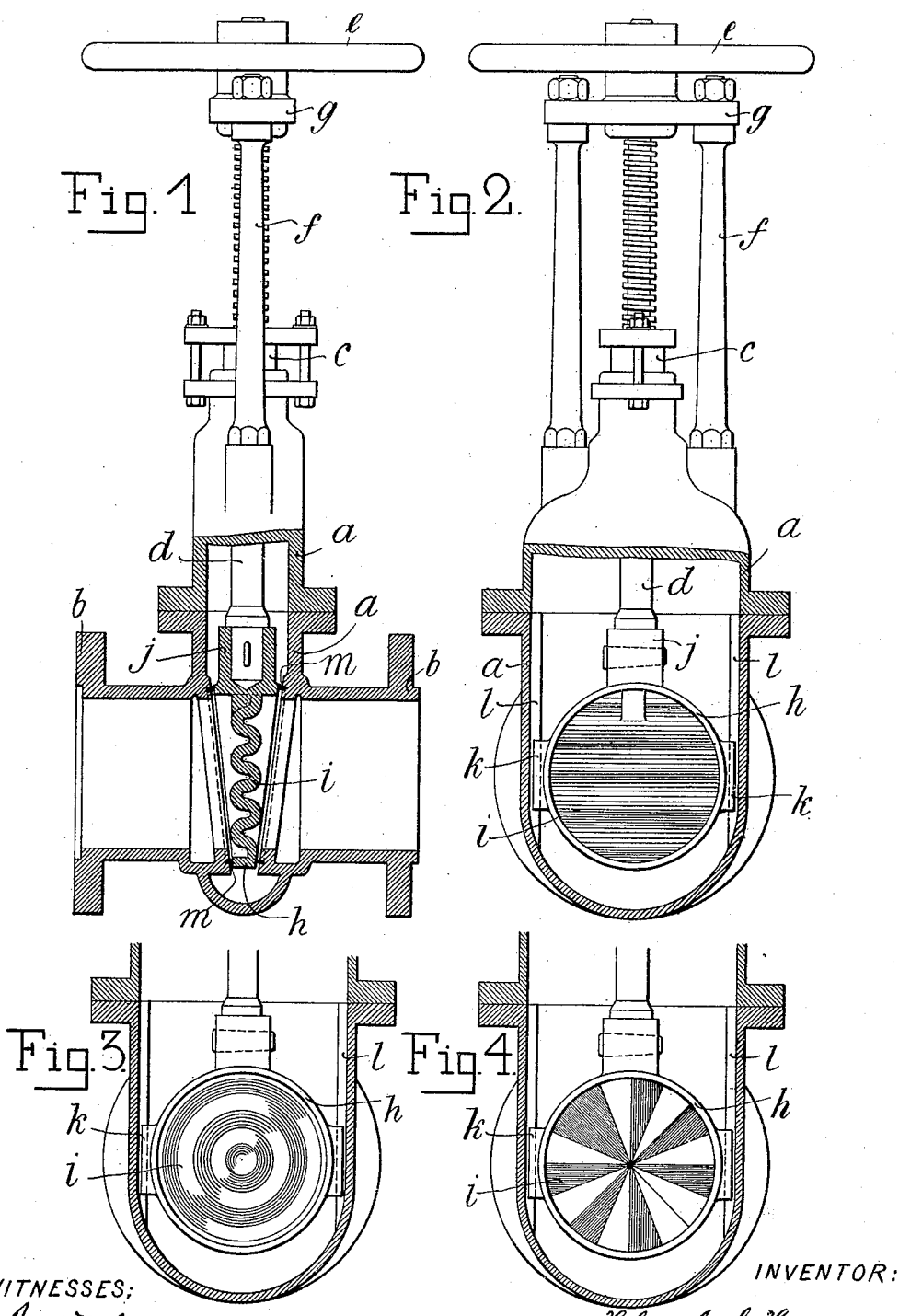

HOLGER AXEL HANSEN, OF COPENHAGEN, DENMARK, ASSIGNOR TO THE FIRM OF
F. MOGENSEN, OF COPENHAGEN, DENMARK.

GATE-VALVE.

No. 891,062.      Specification of Letters Patent.      Patented June 16, 1908.

Application filed March 26, 1907. Serial No. 364,652.

*To all whom it may concern:*

Be it known that I, HOLGER AXEL HANSEN, machine inspector, a subject of the King of Denmark, whose postal address is 28 Gothersgade, Copenhagen, Denmark, have invented new and useful Improvements in Gate-Valves, of which the following is a specification.

The invention relates to gate valves of the kind used for controlling pressure pipes carrying steam, water and the like, and it consists in a peculiar arrangement of the sliding gate, the object being to effect greater tightness of the valves, and consequently a more perfect closure of the pipe than is possible, when using valves of known construction.

The difficulties met with in the production of tight valves for pressure pipes increase with the pressure and also with the temperature of the gaseous or fluid medium to be retained by means of the valve, and the difficulties are therefore particularly great in modern steam plants designed for a high steam pressure and a high degree of superheating, and more especially in the numerous plants, where the pressure is likely to occur on one side just as often as on the other side of the gate. Upon closer investigation the difficulties will be found to arise partly from the elastic deformations due to variations in the pressure, and partly from the expensive deformations due to variations in the temperature. These deformations affect unevenly the valve housing, the valve seat and the valve gate, and, on account of imperfect homogeneity of the material, they will affect unevenly the different parts of a single one of these members, so that a valve, that may be tight at a low temperature, will often leak at a higher temperature, even if the pressure remains unchanged.

The present invention is founded upon the apprehension of the reason for these drawbacks, namely that heretofore stiff unelastic valve gates have been used, and it consists in the indication of the means to avoid the said drawbacks, namely an improved arrangement of the valve gate, combining with the requisite strength and power of resistance the greatest possible elasticity enabling it, under the influence of the pressure, to rest tightly against the whole circumference of the valve seat.

By way of example the invention is, on the accompanying drawing, shown as applied to a gate valve designed to resist pressure from either side.

Figure 1 shows the valve, partly in sideview and partly in longitudinal vertical section, and Fig. 2 the same in vertical cross-section, immediately in front of the valve gate. Figs. 3 and 4 are vertical cross-sections of the valve, showing modified manners of execution of the invention.

Referring to the drawing, *a* is a valve body, with the pipe connections, *b*, *b*, on either side, and the stuffing box, *c*, at top, for the valve spindle, *d*. The latter is threaded at top and carries the hand wheel nut, *e*, supported, by means of the yoke, *g*, on the standards, *f*, in such a manner that it is free to revolve, but cannot slide up or down, so that, according to the direction of revolution, it will raise or lower the threaded valve stem, carrying, at its bottom end, the circular valve gate. This latter consists of an outer ring, *h*, and an inner body, *i*, forming the gate proper. The ring, *h*, has, at top, a suitably formed fastening device, *j*, for the valve stem, and at either side the lugs, *k*, sliding with some play on the guides, *l*, belonging to the valve body. Its thickness increases upwards, the two end surfaces being planed obliquely, and these carefully finished end faces rest against correspondingly shaped and finished packing rings, *m*, on the drawing supposed to be formed by metal rings inserted in the walls of the valve body.

In Figs. 1 and 2, the inner gate body, *i*, in the ring, *h*, has horizontal corrugations, and by this arrangement is attained the combination of sufficient strength to resist the pressure, with sufficient elasticity to allow the ring, *h*, to adjust itself tightly to either one of the packings, *m*, as the case may be, notwithstanding the existence of irregular deformations and expansions due to variations in pressure and temperature, as described above. As mentioned before, this elastic arrangement of the inner gate body or diaphragm is the essential feature of the present invention, and the problem thus brought forward may be solved by several similar constructions of the gate, as long as the same properties therein are secured. The corrugations may, for instance, be run in any other suitable direction, either parallel and rectilinear as in Figs. 1 and 2, or parallel and circular, as in Fig. 3, or they may extend radially from the center of the gate, as shown in Fig. 4. In the cases named, the corrugations will then appear as parallel straight lines, concentric circles or radial straight lines respectively. The action may be supported by varying the depth as well as the width of the corrugations, and, may be, also the thickness of metal at the different points of the diaphragm, it being well known, according to established principles, that the greatest elasticity is attained by using no more material than that which is required for strength.

What I claim as my invention, and desire to secure by Letters Patent, is—

1. In a gate valve, the combination of a body having two obliquely arranged valve seats, and a gate having a ring formed with two oblique faces adapted to contact with said seats, and having a diaphragm within such ring, such diaphragm having sufficient strength to withstand the strains of use and being elastically constructed, whereby said ring maintains a tight fit with said seats, notwithstanding deformations of the valve due to the action of pressure and temperature.

2. In a gate valve, the combination of a body having two obliquely arranged valve seats, and a gate having a ring formed with two oblique faces adapted to contact with said seats, and having a diaphragm within such ring, such diaphragm being formed of corrugated metal whereby said ring makes a tight fit with said seats, notwithstanding deformations of the valve due to the action of pressure and temperature.

3. In a gate valve, the combination of a body having two obliquely arranged valve seats, and a gate having a ring formed with two oblique faces adapted to contact with said seats and having a diaphragm within such ring formed of corrugated metal.

In witness whereof, I have hereunto signed my name in the presence of two subscribing witnesses.

HOLGER AXEL HANSEN.

Witnesses:
 JULIUS LEHMANN,
 HERMAN RÉE.